Aug. 18, 1942.　　　P. G. SCHLEMMER　　　2,293,083
BREAD SLICING MACHINE
Filed Jan. 7, 1939　　4 Sheets-Sheet 1

INVENTOR
Phil G. Schlemmer
BY George S. Hastings
ATTORNEY

Aug. 18, 1942.  P. G. SCHLEMMER  2,293,083
BREAD SLICING MACHINE
Filed Jan. 7, 1939   4 Sheets-Sheet 2
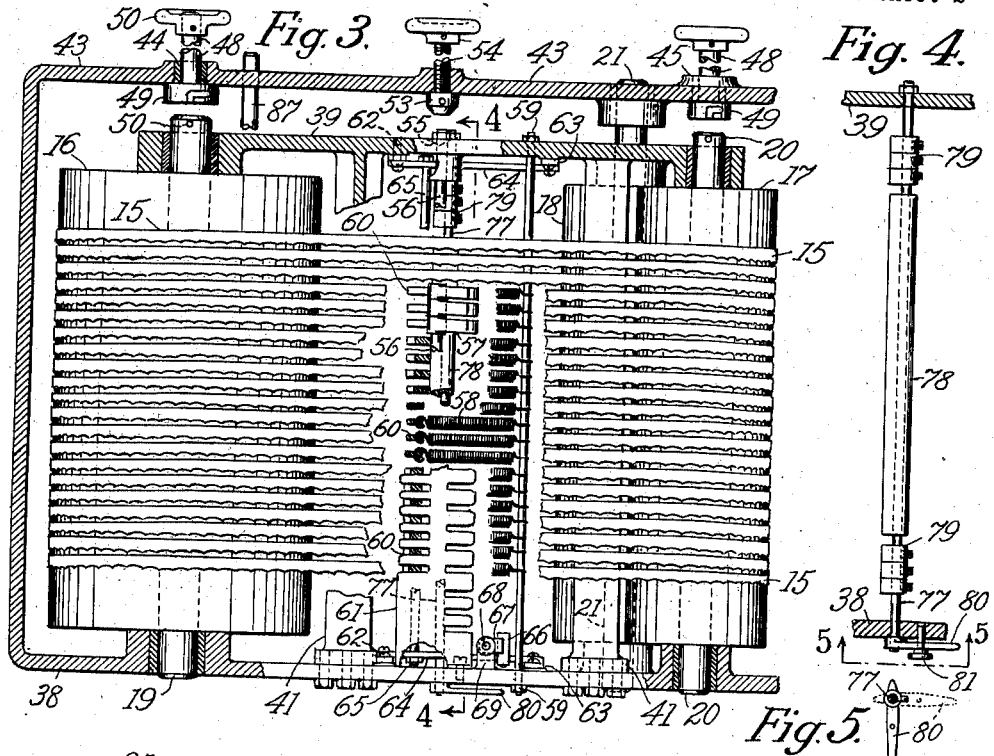
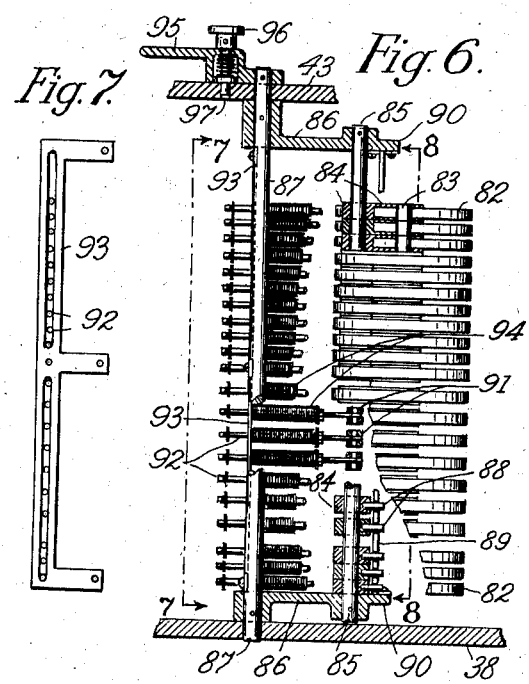
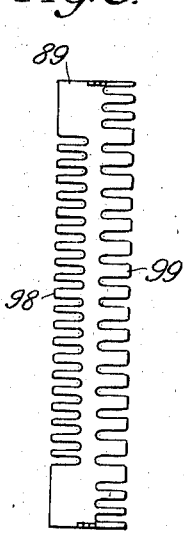
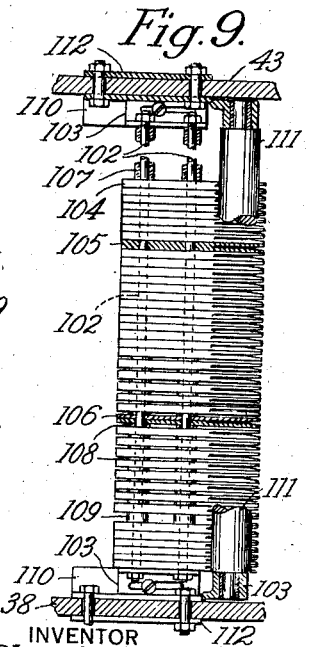
INVENTOR
Phil G. Schlemmer
BY Georges Hastings
ATTORNEY Aug. 18, 1942.       P. G. SCHLEMMER       2,293,083
BREAD SLICING MACHINE
Filed Jan. 7, 1939       4 Sheets-Sheet 3
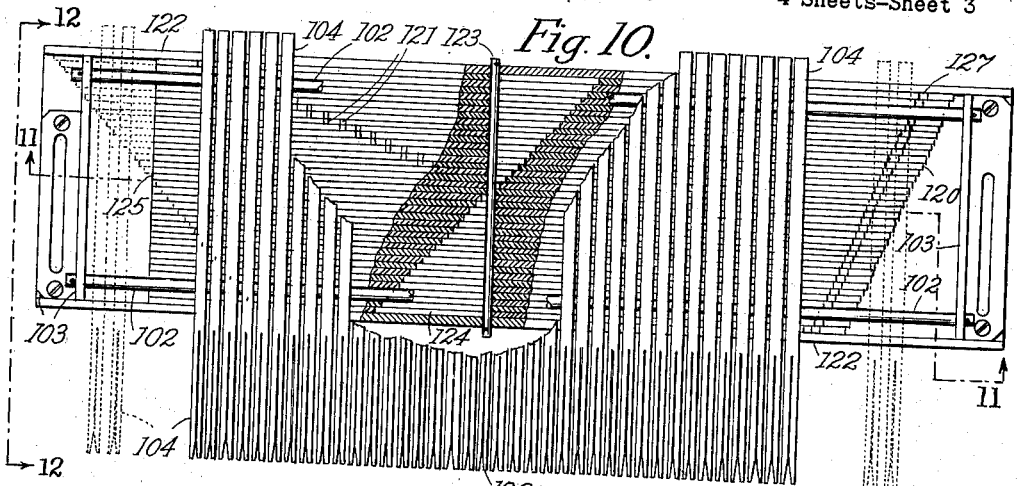
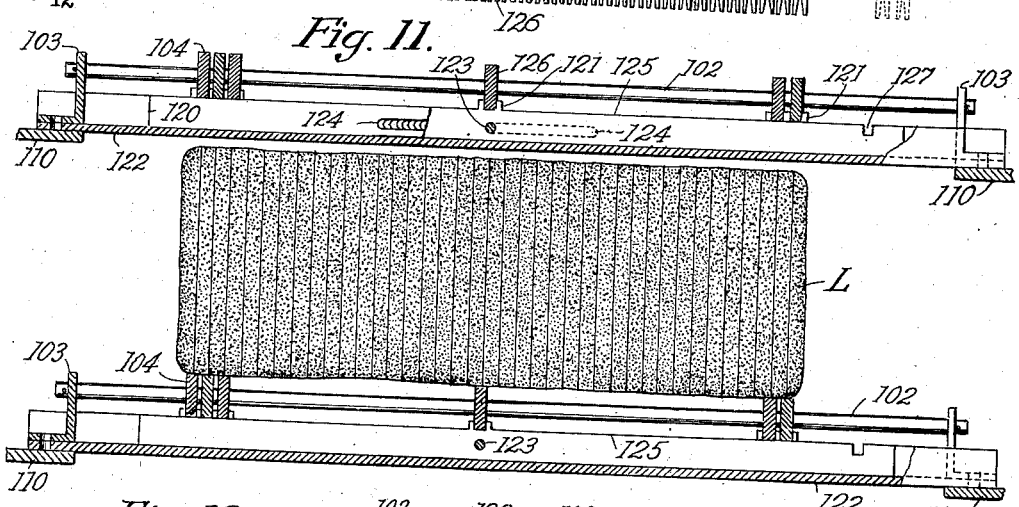
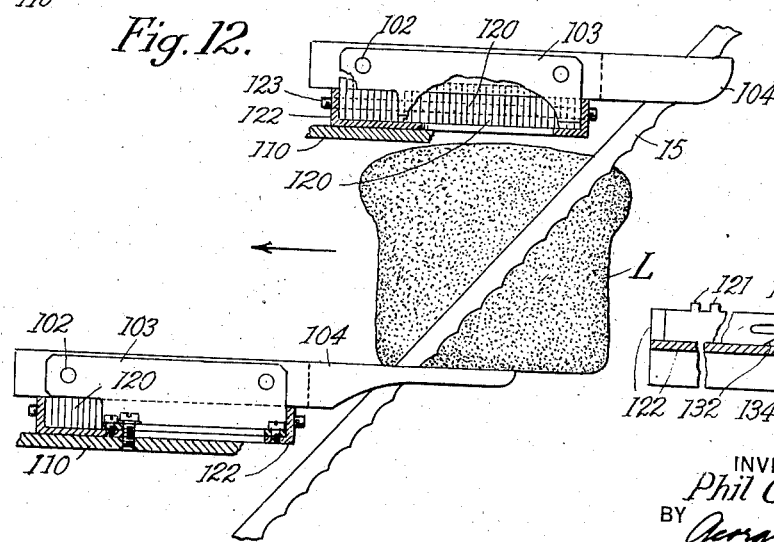
INVENTOR
Phil G. Schlemmer
BY
ATTORNEY

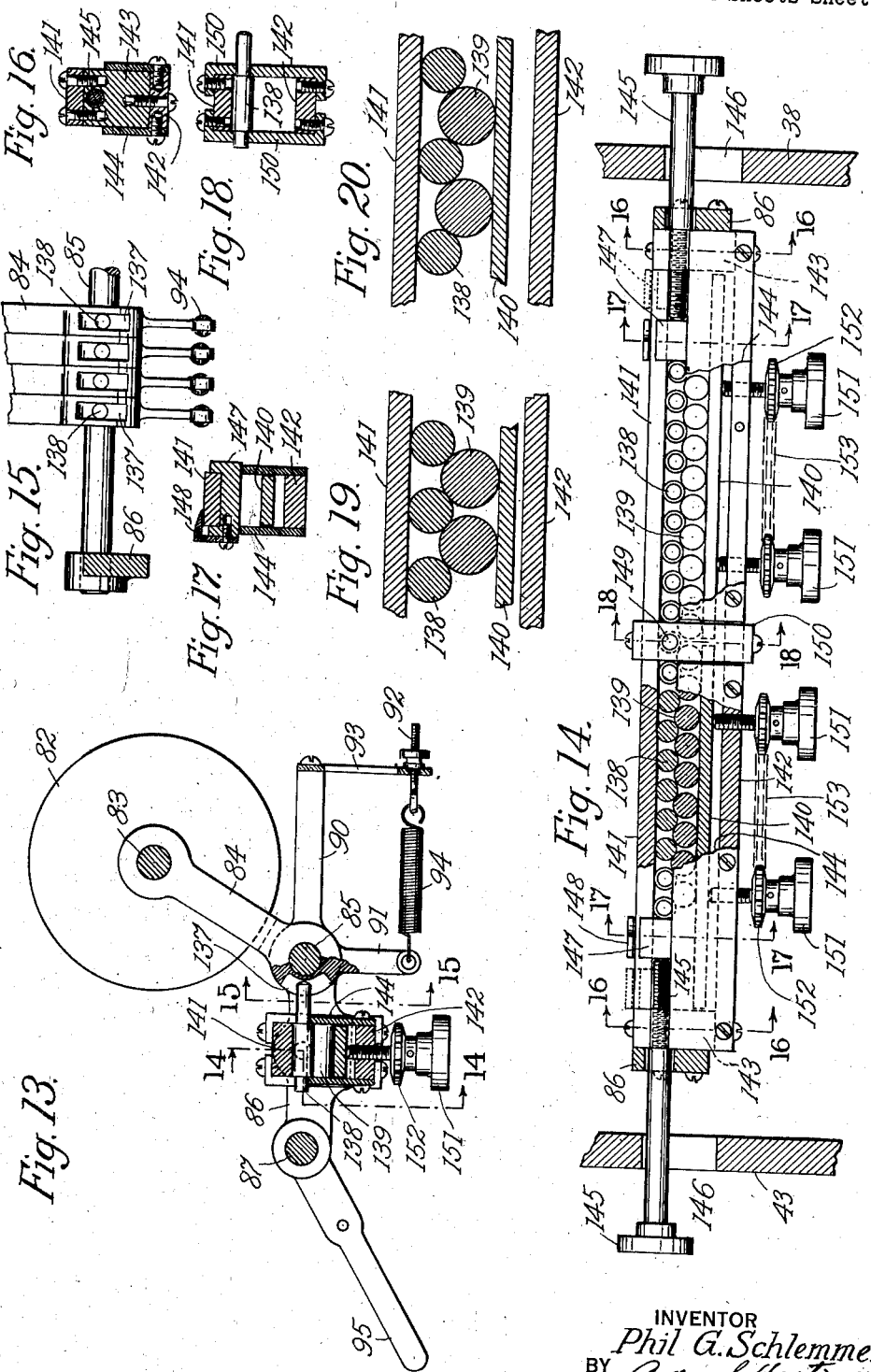

Patented Aug. 18, 1942

2,293,083

UNITED STATES PATENT OFFICE 2,293,083

BREAD SLICING MACHINE

Phil G. Schlemmer, Nanuet, N. Y., assignor to American Machine & Foundry Company, a corporation of New Jersey Application January 7, 1939, Serial No. 249,698

7 Claims. (Cl. 146—88)

This invention relates to bread slicing machines, its main object being to substitute a novel arrangement of continuously moving endless band saws for the reciprocating cutting blades heretofore used. The endless bands are trained over a plurality of drums located below and above the in-feed table, and are so arranged that their cutting edges lie substantially in parallelism and alignment, making an acute angle with the infeed table to slice the loaves from the top forward corner down through the loaf which has been found to be more efficient. Each endless band is constrained to move in such a path that it has two operative laps, one traveling up and one down, as it moves over its supporting drums which are so arranged that a clear space is available at one end for the insertion and removal of the bands. Adjacent the cutting zone, at the rear of the blades and above and below the table, are located pairs of rollers which back up the moving blades without rubbing thereon to avoid wear. The loaves are pushed through the blades by a chain conveyor, the pushing fingers of which are arranged to fold back and drop out of the way of the saw blades as the loaf completes its passage through them.

A further object is to stop the machine in the event of breakage of a band. To this end, safety fingers bearing against each saw band are associated with a novel clutch mechanism which automatically stops the machine in case of breakage of the bands. Individual contact or tension rollers are provided to keep the blades at the proper tension, these rollers being so mounted in a novel manner that they can be quickly moved out of the way as a unit when replacing bands, which constitutes another object of the invention. The bands are guided through the cutting zone by racks or combs above and below the same, which are adjustable relatively to each other and mounted on the holders of the above mentioned blade backing rollers so that they can be moved out of the way simultaneously therewith in accordance with still another object of the invention. These racks consist of vertically slotted fingers spaced to produce the desired thickness of the slices and cause the bands to turn from the flat position coming from the drums to the edgewise position with their cutting edges facing the oncoming loaf.

Still another object is to provide novel mechanism for varying the spacing of the operative runs of the saw bands to produce the requisite thickness of slices. In the various constructions for this purpose illustrated herein the vertically slotted guides are separable to effect a uniform spacing of the saw bands outwardly from the central band saw throughout the cutting region. Auxiliary objects are the provision of adjustments of the tension rollers and feelers or safety fingers to compensate for adjustments of the band saws.

Another important object is to facilitate the adjustment of the band saws, following the retraction of the tension rollers and the setting of the saw band guides in the position requisite for the desired thickness of slice, by temporarily tensioning the bands and driving them to permit the guides to shift them into the desired position. With these and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Fig. 3 is a top plan view of the upper supporting drum and blade backing rollers with a portion of the automatic safety device, shown from line 3—3 of Fig. 1;

Fig. 4 is a sectional detail view on line 4—4 of Fig. 3, showing the latch for the safety fingers;

Fig. 5 is an end view of the same on line 5—5 of Fig. 4;

Fig. 6 is a detail view on line 6—6 of Fig. 1, showing the tension rollers for the band saws;

Fig. 7 is a side view on line 7—7 of Fig. 6, showing the retaining member for the tension springs of the individual tension rollers;

Fig. 8 is a side view on line 8—8 of Fig. 6, showing one form of spacing unit used with the tension rollers;

Fig. 9 is a plan view on line 9—9 of Fig. 1, showing one form of rack for guiding the band saws and maintaining a single predetermined spacing thereof;

Fig. 10 is a plan view on an enlarged scale of an adjustable blade guide rack to be used in place of the permanently spaced rack shown in Fig. 9;

Fig. 11 is a sectional side elevation on line 11—11 of Fig. 10.

Fig. 12 is a sectional end elevation on line 12—12 of Fig. 10;

Fig. 12a is a side elevation showing a device for adjusting the idle bands thereof;

Fig. 13 is a side elevation of the preferred form of tension roll adjusting device;

Fig. 14 is an end elevation, partly in cross-section, on line 14—14 of Fig. 13;

Fig. 15 is a partial end elevation seen from line 15—15 of Fig. 13;

Fig. 16 is a cross-section on line 16—16 of Fig. 14.

Fig. 17 is a cross-section, on lines 17—17 of Fig. 14;

Fig. 18 is a cross-section, on lines 18—18 of Fig. 14;

Fig. 19 is an enlarged view of the sectional portion of Fig. 14, showing the positions of the working parts when set for thin slices; and Fig. 20 is a similar view showing their positions when set for thick slices.

Figure 1:
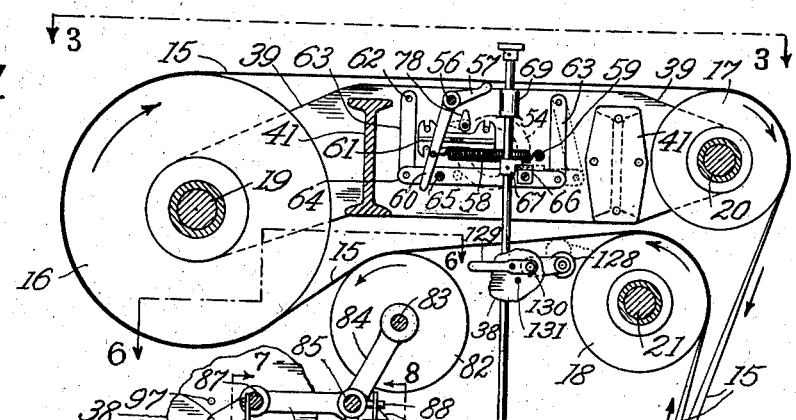
Fig. 1 is a side elevation of the improved slicing machine showing the arrangement of the saw blades and the associated guiding and safety devices.
Figure 2:
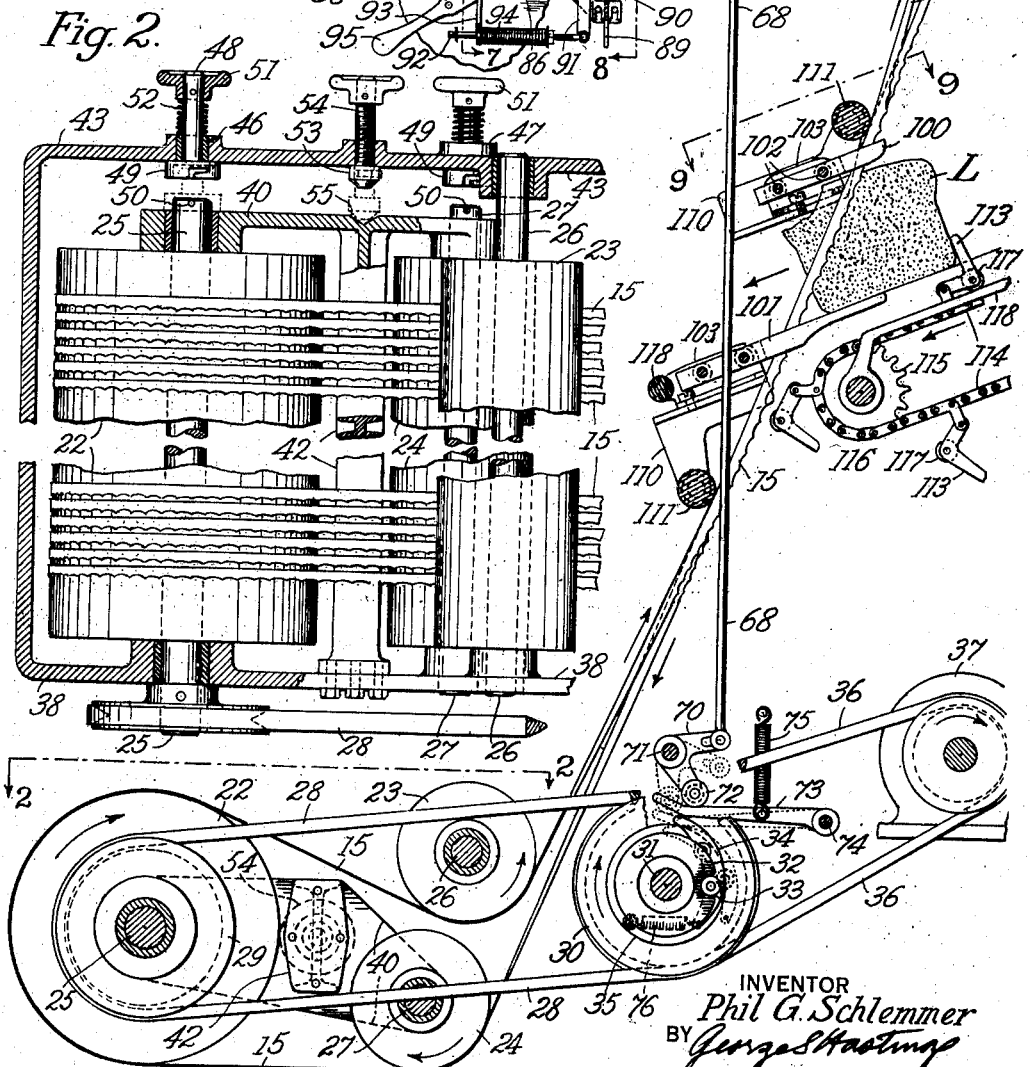
Fig. 2 is a plan view of the lower supporting drums and backing rollers, shown from line 2—2 of Fig. 1.

Referring to Figs. 1, 2 and 3, the bands 15 are strung around three upper drums or pulleys 16, 17 and 18, mounted on shafts 19, 20 and 21, respectively, and around three lower drums or pulleys 22, 23 and 24, mounted on shafts 25, 26 and 27, respectively. The driving drum 22 is connected by a V-belt 28 running over a pulley 29 on its shaft 25 to a pulley 30 loose on a jack shaft 31 and carrying a grooved disk 32 having a notch adapted to engage a roller 33 carried by a spring tensioned lever 34 pivoted on a pulley 35 fast on shaft 31 which is continuously driven by a V-belt 36 from a motor 37.

The shafts 19 and 20 of the upper drums 16 and 17, and the shafts 25 and 27 of the lower drums 22 and 24 are supported at one end in bearings in the front wall 38 of the main frame of the machine and at the other end in separate bearing brackets 39 and 40 attached by strong horizontal arms 41 and 42 to the front wall 38, so as to leave a free space between the brackets 39, 40 and the rear wall 43 of the machine. In order to relieve the stress due to the overhang of the brackets 39 and 40, additional bearings 44, 45, 46 and 47 are provided in the rear wall 43, these bearings carrying studs 48 with bayonet joint couplings 49 which can readily be brought into engagement with radial pins 50 in the respective shafts by pushing hand wheels 51 fastened to the outer ends of studs 48 against the pressure of coil springs 52 on the studs but it is contemplated the additional bearings may be dispensed with. Vibration of the bearing brackets 39 and 40 is minimized by pressing a pointed nipple 53 on the end of a screw 54 in rear wall 43 into a depression 55 provided near the centers of the bearing brackets. The shaft 21 of the drum 18 and the shaft 26 of the drum 23, which do not interfere with the removal and insertion of the saw bands on the drums 16 and 17 and drums 22 and 24, respectively, are supported in the walls 38 and 43 of the main frame, passing across the space provided for the entrance of the bands.

Near the top of bracket 39 a horizontal shaft 56, extending between bracket 39 and front wall 38, carries loose fingers 57 bearing against the lower faces of the upper runs of the bands 15 by the pressure of springs 58 anchored to a cross rod 59, between wall 38 and bracket 39 and attached to downward extensions 60 of the fingers 57. The extensions 60 play in slots of a spacing guide or comb 61 attached to end wall 38 and bracket 39, two different spacings being provided, one in the forward and one in the rearward side of guide 61 which can readily be reversed with the other spacing to compensate for adjustments of the saw bands for different thicknesses of slices. On studs 62 on the interior faces of front frame 38 and bracket 39 are pivoted links 63 which carry a bar 64, the two bars 64 supporting between them a rod 65 juxtaposed to the spring tensioned extensions 60 of the fingers 57. One of the bars 64 carries a cross piece 66 upon which rests a latch piece 67 fastened to a vertical rod 68 sliding in a bearing 69 on front wall 38. The rod 68 is pivoted to one arm of a bell crank lever 70 turning on a stud 71 in the frame of the machine, the other arm of lever 70 carrying a roller 72 engaging with a lever 73 fulcrumed on a stud 74 and held in tension against roller 72 above the path of clutch lever 34 by a spring 75. The lever 73 is adapted to engage with a clutch lever 34, when released the roller 33 of which is held in driving engagement with a clutch disk 32 by a spring 76 anchored on disk 35, whereby the machine is braked and immediately stopped.

In case of breakage of one of the saw bands 15, the particular finger 57 bearing against that band is released, permitting the respective spring 58 to pull the corresponding arm 60 against the rod 65, thereby moving the bars 64 into the dotted position shown in Fig. 1. In this position the cross piece 66 releases the latch 67 permitting the rod 68 to drop. The weight of rod 68 is sufficient to overcome the tension of springs 75 and 76. Hence the lever 70 depresses the arm 73 into the dotted position wherein it engages the pawl 34 and withdraws the roller 33 thereof from disk 32, and the drive pulley 30 stops, immediately bringing the machine to rest.

Upon removal of the broken band, the finger 57 is brought back into its normal position by turning a rod 77 supported between front wall 38 and bracket 39. This rod (Figs. 4 and 5) carries a fixed lock piece 78 extending across the minimum cutting region of the band saws and normally out of engagement therewith and has a number of separately adjustable lock pieces 79 on each side of the minimum cutting region corresponding to the shortest loaf and thinnest slice to be operated on. The rod 77 is provided with a handle 80 which by a pin 81 can be maintained in either of two positions ninety degrees apart. When the machine, at the time of breakage, is set for the thinnest slice when all the bands are in use, as in Figs. 2 and 3, a new band is strung on the drums from the end nearest the empty space and the running tension on the remaining bands is released, as will be described hereinafter. All bands to the outside of the empty space are then placed one space inward on the blade guides 100 and 101 to fill the empty space. The bands are then temporarily placed under tension by raising a long roller 128 into engagement with them through the agency of a lever 129 which normally is in the full line position shown in Fig. 1. The roller 128 swings on a shaft 130 supported within the walls 38 and 43 and is held in either of its extreme positions by a snap pin in lever 129 engaging with holes 131 provided in wall 38. The lock piece 78 is then returned to its vertical position shown in full lines in Fig. 1, and into working position, thereby restarting the band drive. After a couple of revolutions, when the bands have straightened out into their proper places on the drums, they are again placed under individual tension, whereupon the roller is returned to its neutral position.

When the machine is set for thick slices as shown in the lower halves of Figs. 6 and 9, one or more of the bands will run on the drums outside of the cutting region. Hence, in case of breakage, the nearest idle band is moved into place. In this case there will thus be an empty idle space with a corresponding unopposed finger 57. To hold this finger in working position, without throwing out the clutch, one of the separate lock pieces 79 provided on rod 77 is turned back through ninety degrees after locking piece 78 has been returned into neutral position.

Bearing against the lower face of the lower run of each of the bands 15 near the upper main drive 16 there is a series of tension rollers 82 turning on studs 83 in a corresponding number of holders 84 (Figs. 1 and 6). The holders 84 are loosely mounted on a shaft 85 carried in arms 86 fast on a shaft 87 supported in side walls 38 and 43. From the hub of each of the holders 84 projects radially a pin 88 which enters one of the slots of a vertical comb-shaped spacer 89 and reversible and detachable therefrom, supported between extensions 90 of the arms 86. Arms 91 extending downwards from the hubs of the holders 84 have pivoted thereon threaded rods 92 passing through slots of a rail 93 (Fig. 7) affixed to flats on shaft 87, the rods 92 carrying springs 94 bearing against nuts threaded thereon and seated against the rail 93 for pressing the wheels 82 against the bands 15. To the shaft 87 is affixed a handle 95 which can be locked by a snap pin 96 in either of two holes 97 in the end wall 43, handle 95 in its upper position swinging the entire tension wheel system out of engagement when required for the removal or replacement of bands.

In Fig. 8 the construction of the spacer 89 is shown, one edge being slotted for thin slices, corresponding to the edge which is uppermost in Fig. 6, and the other edge 99 for thick slices, corresponding to the edge which is lowermost in Fig. 6. When changing the machine from thin to thick slices, the spacers 61 and 89 are reversed and the set of band guides having the spacing shown in the upper half of Fig. 9 is replaced by a set having the spacing of those in the lower half thereof. If desired, a spacer similar to the comb 99 may be employed for separating the band guides; and the bands not used for cutting the thick slices are placed into the slots at either end of the comb, which have a closer spacing outside of the cutting range and may be employed for cutting in case of breakage of one of the bands.

Above and below the infeed chute of the loaves L, are located two similarly arranged blade guides 100 and 101, the top view of the upper guide 100 being shown in Fig. 9. On two shafts 102 supported between vertical brackets 103 are a plurality of vertically slotted guide members 104, two for each band 15, either made in one piece as shown at 105 in Fig. 9, or of two pieces spot welded together, or to a base (not shown) as shown at 106. For thinnest slices all the guide spices 104 are mounted on the shafts 102 in contact with one another along the entire cutting region of the band drums, and spacing sleeves 107 are placed between the outermost guides 104 and the brackets 103 as shown in the upper half of Fig. 9. For thick slices the individual guides are assembled with spacing collars 108 of the proper thickness between them within the cutting region, as shown in the lower half of Fig. 9. The guide pieces for the bands outside the cutting region may be placed closely together adjacent the brackets 103, with a guide collar 109 between them and the outermost band guides of the cutting region. The brackets 103 are horizontally adjustable lengthwise of the band guides on the horizontal brackets 110 mounted on the side wall 38 and 43 and carry backing rolls 111 spaced slightly from the rear edges of the blades 15 above and below the infeed chute which resist the thrust of the loaves on the bands. The upper guide 100 is also vertically adjustable for different heights of loaves, the horizontal brackets 110 being clamped to plates 112 through vertical slots of the side walls, Fig. 9.

Starting at the top, each band 15 is looped over the drums 16 and 17, then inserted into one vertically aligned pair of guides 100 and 101, looped in turn around the lower drums 24, 22 and 23, and finally inserted into the next vertical pair of guides 101 and 100, one pair of upper guides 100 and the corresponding pair of lower guides 101 being provided for each saw band so that cutting edges of both runs of each band will face the loaves. When all the band saws have been positioned on the drums and guides, the tension rollers are swung into operative position, thus drawing the band saws taut against the rolls 18 and 23.

The bread loaf L is pushed against the cutting edges of the bands 15 and through the bands by fingers 113 pivoted at spaced intervals to the links of an endless chain 114 driven by a sprocket 115 on a shaft 116 below the lower blade guide 101 and near the cutting plane of the bands 15, Fig. 1. The saw bands are disposed at a suitable acute angle to the path of the loop to initially cut the forward front corner of the loaf and cut down through it on a bias. An angle of 34 degrees has been found satisfactory. The pusher fingers 113 have rollers 117 resting on a cam track 118 supported by shaft 116, this cam track being so shaped that the rollers 117 drop away from the loaf and permit the fingers 113 to swing back as the loaf completes its passage through the saw bands. Attached to the brackets 103 of the lower guide rack 110 is a roller 118 so placed that the loaves on leaving the blades engage the same and are subjected to the vibration caused by its turning, thereby shaking off the bread crumbs carried along by the sliced loaf. These crumbs may be collected in a suitable receptacle and disposed of from time to time, or may be continuously carried out of the machine by a screw propeller or other suitable means.

Instead of providing a separate permanently spaced guide rack 100, 101 for each thickness of slice desired, an adjustable blade guide such as shown in Figs. 10 to 12 may be employed. The slotted guide members 104, which as stated before are slidably mounted on a pair of shafts 102 supported by brackets 103, are in this case also fastened on transverse bars 120, one bar for each guide member. Each bar has upwardly extending prongs 121 for the reception of one of the guide members which is welded between them so that all guide members 104 lie across the tops of bars 120 with the proper spacing. The bars 120 are longitudinally slidable in a channel shaped holder 122 and the prongs 121 are so dimensioned and spaced that in the innermost position of the bars 120 the slots in the guides 104 have the proper spacing for the thinnest slices to be cut. The brackets 103 are attached to holder 122 which is slidably supported on the brackets 110 for lengthwise adjustment of the guides. The displacement of the shifter bars 120 is limited by a cross pin 123 in holder 122, each bar having a longitudinal slot 124 of the proper length to permit the corresponding guide to be shifted only to its exact position for the thickest slices to be cut by the machine. The central bar 125 which must always be in the center of the loaf L, has a circular hole to fit the pin 123 so that it cannot be moved. The two bars immediately adjoining the center bar 125 have slots permitting only a movement equal to the difference between the thinnest and thickest slices to be cut, the slot in the bar at one side of bar 125 permitting motion to the left and that in the bar at the other side, motion to the right. The next bar on each side has a longer slot, permitting a movement equal to twice the difference between the thickest and thinnest slice and the length of the slots in the successive bars increases in same ratio, the outer bars having slots permitting movement equal to as many times the difference of the slice thickness as there are bars on each side of the center bar 125. Near one end of each shifter bar a horizontal notch 127 is cut in such a position that all slots 127 are aligned when the bars are half way between the extreme positions permitted by the slots. Thus, the guides 104 can be readily placed in three different band saw spacing positions: for minimum or maximum thickness of slices, by pushing the shifter bars 120 to the respective ends of the slots 124, and the medium thickness of slices by aligning the slots 127 by pushing a bar through them, across the top of holder 122. The bars have a sliding fit with their holder such that they will retain their adjusted positions without displacement. If desired, a tool (not shown) may be used for separating the bars to obtain the desired slice thicknesses.

It may be noted that the lower blade guides 104 have flat upper faces which engage the bottom of and support the loaves as they are advanced through the band saws. Likewise the supports of the upper blade guides may be preferably reversed to permit their flat upper faces to engage the tops of the loaves to prevent displacement thereof.

To enable the idle end bands (which are not within the cutting range when slicing short loaves or when cutting thick slices) to be moved away from the end of the loaf to prevent cutting off the overhang or "heel," the arrangement shown in Fig. 12a is used. The slots 124 in the idle bars 120 are made longer than shown in Fig. 10, and the bars 120 are provided with V-grooves 132 on their under side. The holder 122 carries transverse shafts 133 in flanges 134 thereof, on which are mounted triggers 135 tensioned by springs 136, these triggers snapping into the V-grooves 132 when the bar 120 is in the proper positions for slicing, corresponding to the ends of the slots in Fig. 10, and the intermediate position therein. When the band saw of any bar 120 becomes idle, the bar can be moved beyond its slicing position by pushing it out of the trigger hold to the end of its elongated slot 124 so that it will not mutilate the overhang.

In the case of the guide racks 100 and 101, it may be noted that the thickness of the guide collar 109 is greater than that of collars 108 to space the blade guides immediately outside the cutting region a thickness greater than the thickness of the end slices to prevent cutting of the heel or overhang thereon. The same is true of the comb 99 wherein the slots having a narrower spacing outside the cutting region are separated from the cutting region by teeth whose thickness is greater than the thickness of the end slices.

In Figs. 13 to 20, an adjustable blade tension unit is shown. Here, the hubs of the holders 84 of the individual tension rollers 82 are provided with vertically extending grooves 137 for the reception of shouldered rollers 138 which bear against the sides of the said grooves. The rollers 138 are supported on balls or rollers 139 resting on adjustable press plates 140 in a box consisting of a top rail 141 and a bottom rail 142 attached to end blocks 143, and of side plates 144 fastened to the bottom rail 142 and extending up to the reduced portions of the roller 138, thus retaining the rollers 138 and 139 against axial movement. The roller box extends between the arms 86 of the tension unit, its end blocks 143 being attached to said arms. The end blocks 143 are threaded for the reception of screws 145 passing through arcuate slots 146 in the side walls 38 and 43 and bearing against slides 147 which are set by these screws for the slice thickness to which the bands are adjusted. For thickest slices, the slides 147 bear against the interior of end blocks 143, see dotted position thereof in Fig. 14. For thinnest slices, the knobs of screws 145 bear against the exterior of end blocks 143, see full line position in Fig. 14, and for intermediate slice thickness, a pointer 148 on slide 147 is set at the respective mark on top rail 141. Two sets of slides, adjusting screws, and press plates are acquired because the setting roller 149 of the center tension roller 82, which must always be in the center of the loaf L, is held stationary by cleats 150 attached to the rails 141 and 142 (Fig. 18).

The slides 147 are set to the desired slice thickness, and the plates 140 are raised by means of screws 151 to wedge the rollers 139 into intimate contact with the rollers 138, whereby the latter are all equally spaced. The position of the adjusting parts for thinnest and thickest slices is shown in Figs. 19 and 20, respectively. The adjusting rollers 139 are made larger in diameter than the setting rolls 138, so that for thickest slices their centers are below those of the latter, thereby insuring their quick release when lowering plates 140. To insure levelness of the plates 140 during adjustment, the screws 151 are provided with sprockets 152 and the two sprockets for each plate are connected by chains 153 so as to always turn in unison.

It will be understood that all the guide bars 120 may be provided with sets of grooves 132 for reception of spring-pressed triggers, to retain the band guides in the various positions required for different slice thicknesses. In the case of the outer bands, which would otherwise cut a heel much narrower than the slice thickness or mutilate the overhang thereof, they may be moved inward toward the next bands to cut a thicker heel and avoid mutilating the overhang, instead of outward as described above. Accordingly, grooves may be provided in their respective guide bars 120 to retain them in the inward position.

With the spot-welded construction of the band guides contemplated, besides avoiding the difficulties inherent in forming slots of such narrow width, there is another advantage. By spot welding two flexible slices to each other at points sufficiently behind the bases of the slot so formed therebetween, flexure of the pieces will decrease the wear on the saw bands due to their twisting into operative position.

What is claimed is:

1. In a slicer, the combination with a plurality of band saws, of means for guiding and driving said band saws, a series of guides arranged to engage said bands for maintaining a predetermined equal spacing thereof, movable members extending transversely of said band saws and rigidly connected to said guides for relatively moving the guides for separating said bands, and a device for holding said members, when they have been adjusted to effect a predetermined equal spacing of said bands at greater intervals, against further relative movement, said members being provided with notches parallel to said adjacent blade runs, and said device including a bar adapted to enter said notches, said notches being disposed in such relation to each other when said members have been adjusted to effect said greater equal spacing of said bands, to admit said bar.

2. In a slicer, the combination with a plurality of band saws, of means for guiding and driving said band saws, a series of guides arranged to engage said bands for maintaining a predetermined equal spacing thereof, a support, movable members slidably mounted on said support and rigidly connected to said guides for relatively separating said bands, and means for limiting the relative sliding movement of said members at points corresponding to a desired minimum, maximum and intermediate separation of said bands, said means including a series of detents arranged to engage said members and maintain them at the positions corresponding to the desired minimum, maximum and intermediate separation of said bands, and each of said members being provided with three spaced notches arranged to be engaged by the corresponding detent when said members are respectively at the positions corresponding to the desired minimum, maximum and intermediate separation of said bands.

3. In a slicer, the combination with a plurality of band saws, of means for guiding and driving said band saws, a series of members having slots adapted to admit and guide said relatively movable bands, relatively movable bars extending transversely of said bands and fastened to said members for relatively moving the members and thereby separating said bands, a pin passing through said bars, the central bar having a perforation closely fitting said pin to prevent movement thereof, and the other bars having elongated slots admitting said pin, the slots in the bars at either side of the central bar extending in opposite directions and the length of the bar slots being proportioned to limit the movement of the bars relatively to the pin to establish a minimum and maximum equal spacing of the bands when the ends of the slot engage with the pin.

4. In a slicer, the combination with a plurality of band saws, of means for guiding and driving said band saws, a series of members having slots adapted to admit and guide said relatively movable bands, relatively movable bars extending transversely of said bands and fastened to said members for relatively moving the members and thereby separating said bands, a pin passing through said bars, the central bar having a perforation closely fitting said pin to prevent movement thereof, and the other bars having elongated slots admitting said pin, the slots in the bars at either side of the central bar extending in opposite directions and the length of the bar slots being proportioned to limit the movement of the bars relatively to the pin to establish a minimum and maximum equal spacing of the bands when the ends of the slot engage with the pin, and a detent for limiting the movement of the bars intermediate the points at which their slot ends touch the pin, to maintain an intermediate equal spacing of the bands.

5. A bread slicer, comprising in combination, loaf forwarding mechanism, a series of band saw runs arranged in transversely spaced relation across the path of a loaf forwarded by said mechanism, a plurality of guide members each adapted to embrace and guide one of said runs, means mounting each of said guide members for transverse movement relative to said path and relatively to each other to adjust the spacing of said band runs, and means for moving said guide member mounting means to displace said bands from one series of equally spaced positions into another series of equally spaced positions having a greater or less spacing than the first series in order to cut slices of different thickness including a series of elongated elements connected one to each of said guide members and extending laterally of said path and an immovable member coacting with juxtaposed portions of said elongated elements to maintain said guide members in any one of a plurality of predetermined equispaced positions.

6. A bread slicer, comprising in combination, loaf forwarding mechanism, a series of band saw runs arranged in transversely spaced relation across the path of a loaf forwarded by said mechanism, a plurality of guide members each adapted to embrace and guide one of said runs, means mounting each of said guide members for transverse movement relative to said path and relatively to each other to adjust the spacing of said band runs, and means for moving said guide member mounting means to displace said bands from one series of equally spaced positions into another series of equally spaced positions having a greater or less spacing than the first series in order to cut slices of different thickness including a series of elongated elements connected one to each of said guide members and extending laterally of said path and means coacting with said elongated elements to maintain said guide members in any one of a plurality of predetermined equispaced positions, said elements including bars adapted to be manually moved lengthwise and transversely of said path to any desired position and said coacting means including abutment surfaces on said bars and immovable gauge means for engaging said abutment surfaces.

7. In a slicer, the combination with a plurality of band saws, of means for guiding and driving said bands, guides engaging said bands for maintaining a predetermined equal spacing thereof, relatively movable members supporting said guides and adapted to be displaced with the guides to a variety of positions corresponding to various predetermined equal spacings of the bands, and a series of stationary latches adapted to engage the said members and maintain them in the various positions to which they are displaced with the guides for establishing the various spacings of the bands.

PHIL G. SCHLEMMER.